United States Patent
Klug et al.

(10) Patent No.: US 8,219,216 B2
(45) Date of Patent: Jul. 10, 2012

(54) METHOD AND APPARATUS FOR SYNCHRONIZING CONFIGURATION CHANGES ACROSS MULTIPLE COMPONENTS OF AN INDUSTRIAL CONTROL SYSTEM

(75) Inventors: Darren R. Klug, Willoughby, OH (US); Petr Ptacek, Chagrin Falls, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 397 days.

(21) Appl. No.: 12/467,031

(22) Filed: May 15, 2009

(65) Prior Publication Data

US 2010/0249951 A1  Sep. 30, 2010

Related U.S. Application Data

(63) Continuation of application No. 12/413,712, filed on Mar. 30, 2009.

(51) Int. Cl.
*G05B 11/01* (2006.01)
(52) U.S. Cl. ............. 700/18; 700/19; 700/20; 700/86; 709/222; 345/418; 345/419; 345/420
(58) Field of Classification Search ............... 700/17, 700/18, 19, 83, 86; 345/418, 419, 420; 709/222
See application file for complete search history.

(56) References Cited

U.S. PATENT DOCUMENTS

| | | | |
|---|---|---|---|
| 6,327,511 B1 * | 12/2001 | Naismith et al. | 700/19 |
| 6,819,960 B1 * | 11/2004 | McKelvey et al. | 700/17 |
| 7,062,335 B2 * | 6/2006 | Klindt et al. | 700/83 |
| 7,065,415 B2 * | 6/2006 | Kay et al. | 700/87 |
| 7,565,351 B1 * | 7/2009 | Callaghan | 1/1 |
| 7,693,581 B2 * | 4/2010 | Callaghan et al. | 700/9 |
| 7,932,809 B2 * | 4/2011 | Nair et al. | 340/5.2 |

* cited by examiner

*Primary Examiner* — Albert Decady
*Assistant Examiner* — Douglas Lee
(74) *Attorney, Agent, or Firm* — Boyle Fredrickson, S.C.; R. Scott Speroff; John M. Miller

(57) ABSTRACT

An industrial control system includes an industrial controller and a series of bridge devices logically connected in a cascaded arrangement to facilitate data communication between the industrial controller and an I/O device. The control system further includes a programming interface connected to the industrial controller to provide modifications to the program and component configuration. Modifications are provided to the controller and to the bridge devices across the network in a multiphase operation that includes a first operation that cascades the modifications from the industrial controller and to the bridge devices, and a second operation that cascades a apply command to the industrial controller and to the bridge devices instructing the industrial controller and the bridge devices to update the configuration of each of the devices based on the modifications provided in the first phase only upon acknowledgement that the industrial controller and each of the bridge devices has accepted the modifications.

18 Claims, 9 Drawing Sheets

METHOD AND APPARATUS FOR SYNCHRONIZING CONFIGURATION CHANGES ACROSS MULTIPLE COMPONENTS OF AN INDUSTRIAL CONTROL SYSTEM

CROSS-REFERENCE TO RELATED APPLICATIONS

This application is a continuation of U.S. application Ser. No. 12/413,712 filed Mar. 30, 2009, entitled "Universal Network Adaptor for Industrial Control Networks," hereby incorporated by reference.

STATEMENT REGARDING FEDERALLY SPONSORED RESEARCH OR DEVELOPMENT

BACKGROUND OF THE INVENTION

The present invention relates to industrial control systems for controlling machinery and processes and, in particular, to an adapter architecture to enable a programmable controller to operate with a variety of different networks in a manner that makes the differences between the networks invisible to the controller.

Industrial control systems are special-purpose computers for controlling machinery and equipment. In contrast to more conventional computer systems, industrial control systems generally provide greater flexibility and hardware configuration (to match a variety of different control applications) and have a higher standard of reliability and predictability necessary for real-time control of complex machinery.

Greater flexibility in hardware configuration is typically obtained by a modular and distributed construction in which an industrial control system may be assembled of multiple modules, for example, a central programmable controller connected to an arbitrary number of I/O modules, the latter providing communication with various switches and sensors on the machine.

The various components of the industrial control system may be connected together by means of a high-speed "control network" using a variety of special protocols that ensure predictable, timely and reliable communication of control data. For example, control network protocols may employ "connected messaging" in which the bandwidth of the network and buffer space is pre-allocated to dedicated "connections" to prevent lost or unpredictably delayed data transfer that can occur in standard network protocols such as Ethernet.

A variety of different control networks have been developed by different manufacturers and for different control applications, each having different communication protocols. Protocol as used herein refers not simply to the format of the data (e.g. baud rate, the number of bits, error correction codes and the like), but also to the steps of establishing a connection, assigning addresses to connections, handling connection errors, sending acknowledgment messages and the like.

Often, the programmable controller of an industrial control system must communicate with control components connected over multiple different control network types. This is normally done through the use of special-purpose software tools which produce programs running concurrently with the industrial control program to provide the necessary network handling (a.k.a. gateway) logic for the different networks. These software tools increase the complexity of programming and of configuring the industrial control system by adding additional programming steps and operating programs. As new networks are integrated into the control system, the control program may need to be revised, an often costly exercise. In addition, the additional communication overhead can adversely affect the operation of the control system.

SUMMARY OF THE INVENTION

The present invention provides a general, architecture for adapters of I/O devices on different control networks. The adapter works independently of the controller and thus allows the controller to be programmed as if all devices were on a single common network-type, simplifying the programming task and decreasing the demands on the programmable controller. The adapters per this invention rely on a downloadable script library, where the script library contains the scripts necessary to invoke the control network-specific and device-specific functions (e.g. download configuration, verify the identity, open a messaging or I/O connection, translating data types, converting Endianess for each type of I/O device connected to it. As new classes of I/O Devices are required, new device-specific scripts are added to the downloadable library. Only in the event that new, network-specific functions are introduced will the firmware of the adapter need to be updated.

Specifically then, the present invention provides a network interface for a programmable controller controlling a plurality of I/O nodes on different I/O networks using different communication protocols. The network interface may include a set of adapter interfaces providing hardware connections to the different I/O networks of the I/O nodes and at least one controller network interface circuit providing a hardware connection to a controller network communicating with the programmable controller.

The network interface also provides a memory holding a network adapter program, script files, and configuration files, and a processor executing a program that:

receive and store in memory, script files associated with the different networks and I/O devices for execution to translate between protocols of the programmable logic network and the particular I/O network;

receive from the programmable controller and store in memory configuration files associated with particular I/O networks and describe configuration parameters for the particular I/O networks;

before communication between an I/O node and the programmable controller, configure the I/O networks according to the associated configuration file; and in response to communication between an I/O node and the programmable controller, execute a script associated with the I/O network to translate between protocols of the I/O network and controller network.

It is thus one object of the invention to permit the programmable controller to communicate with I/O nodes as if they were directly connected to the controller network. It is an ancillary object of the invention to simplify the programming of industrial control systems, and to permit their ready adaptation of control programs to different or new control networks and I/O Devices.

The controller network interface circuit may provide network functionality that is a superset of the I/O networks.

It is thus an object of the invention to provide a controller interface that does not constrain the functionality of the I/O networks.

The controller network may operate according to a connected messaging protocol in which communications between devices are subject to pre-designated connections specifying message timing, frequency, and size.

It is thus an object of the invention to provide connected messaging in the connection between the network interface and the programmable controller such as may accommodate the necessary logical mapping between different networks through the use of the connection model.

The script files may be received from the programmable controller.

It is thus an object of the invention to permit updating and initialization of the adapter by the programmable logic controller and thus to provide a single repository for controller information.

The controller network may use the EtherNet/IP protocol.

It is thus an object of the invention to leverage off a well-established high-end control network.

The scripts may further include a mapper translating between addresses on the controller network and addresses on the I/O network.

It is thus an object of the invention to accommodate different address structures associated with different control networks in a manner invisible to the control program.

The I/O networks may include EtherNet/IP, DeviceNet, ControlNet as well as SerBus, 69-Bus, HART, ModBus, and Foundation FieldBus.

It is thus an object of the invention to provide for integration among control networks of widely varying types and performance.

The I/O network interface circuits may provide electrical connectors allowing them to be removably attached to a common bus.

It is thus an object of the invention to provide a practical method of accommodating future network types and physical layers.

The network adapter program may execute a scanning protocol for sequentially exchanging data between the programmable controller and each of the I/O nodes on a regular schedule with a predetermined order.

It is thus an object of the invention to provide a data exchange method that provides for desired repeatability and control system operation.

The programmable controller and I/O nodes may communicate among each other using a buffer table, the buffer table subject to distinct to read and write cycles.

It is thus an object of the invention to eliminate the need for the programmer of the control program to attend to synchronization issues.

The network adapter may include a housing holding the components of the network adapter and physically independent from the programmable logic controller and the I/O nodes.

It is thus an object of the invention to permit the adapter to be used with a wide variety of different programmable controllers both existing in the field and to be designed.

The foregoing and other aspects of the invention will appear in the following description. In the description, reference is made to the accompanying drawings, which form a part hereof, and in which there is shown by way of illustration a preferred embodiment of the invention. Such embodiment does not necessarily represent the full scope of the invention, however, and reference must be made to the claims herein for interpreting the scope of the invention.

BRIEF DESCRIPTION OF THE FIGS.

DETAILED DESCRIPTION OF THE PREFERRED EMBODIMENT

Network Adapter Appliance

Figure 1:
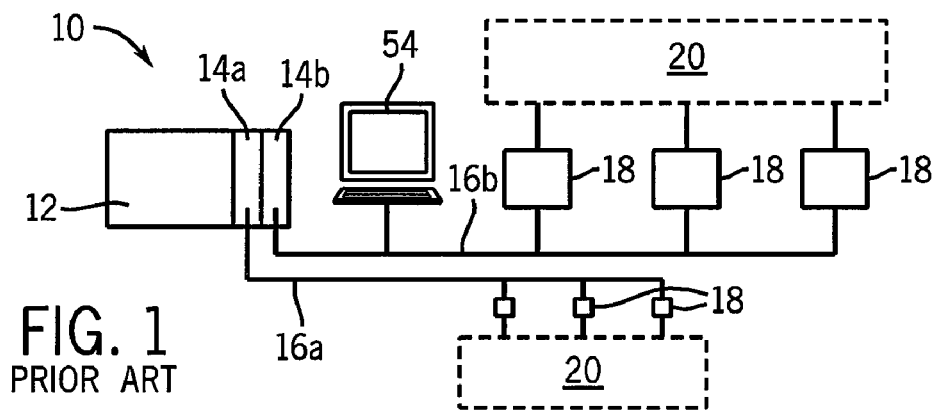
FIG. 1 is a block diagram of a prior control system having a programmable controller communicating with a variety of I/O modules over multiple networks.

Referring now to FIG. 1, a control system 10 may include, for example, a programmable controller 12 such as a Logix™ controller commercially available from Rockwell Automation Inc. and including one or more network modules 14a and 14b each connected to a different control network 16a, 16b respectively. Such control networks 16 may include EtherNet/IP, DeviceNet, ControlNet, SerBus, 69-Bus, HART, ModBus, and Foundation FieldBus, however the present invention is not limited to these network designs but is generally intended to work with arbitrary network protocols including those yet to be defined.

Figure 2:
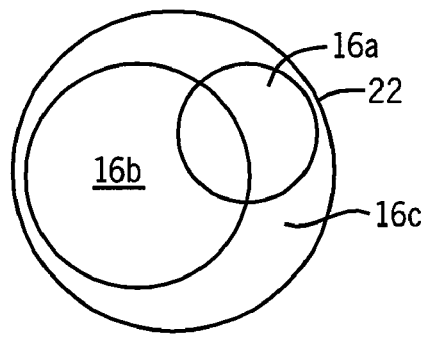
FIG. 2 is a Venn diagram showing the functionality of the controller network as a superset of the I/O networks.

Referring momentarily to FIG. 2, some of the control networks 16, for example, control network 16b, may provide a substantially greater functionality 22 (for example in terms of setting network parameters, operating in different modes, obtaining diagnostic information, etc.) than other networks 16a, reflecting, in part, specialization for different tasks and different hardware capabilities of the attached devices. These functionalities 22 together define a meta-network 16' having a functionality 22 practically capable of matching the combined functionalities 22 of the networks 16a and 16b.

Figure 3:
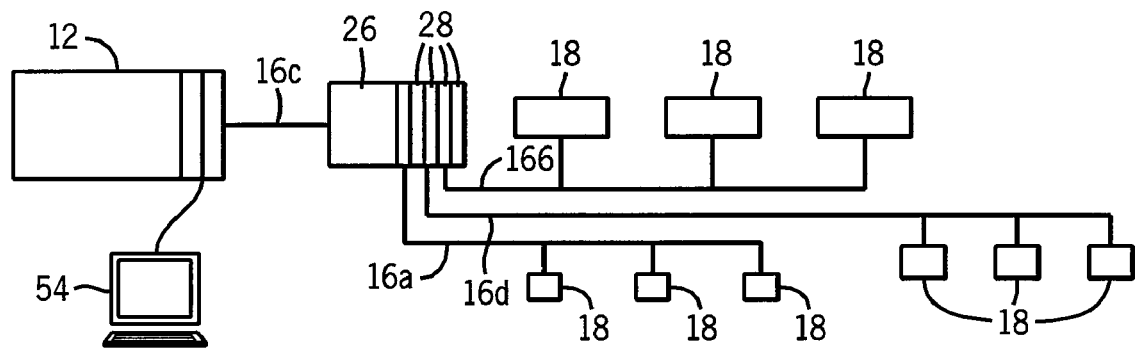
FIG. 3 is a figure similar to FIG. 1 showing use of the adapter appliance of the present invention presenting a single logical network to the programmable controller made up of different proprietary physical networks.

Referring now to FIG. 3, this superset network 16' provides a model for a common network 16c used in the present invention to connect the programmable controller 12 to the integration appliance 26 of the present invention. Preferably the network 16c is a powerful existing network, for example EtherNet/IP, providing the highest level of functionality of the various networks 16. It is expected that the common network 16c will be a connected messaging system which provides a high level of network security reliability and diagnosis information as well as allows all data transfers to be handled as well-defined connections, greatly simplifying the creation of a control program.

The integration appliance 26 holds a set of proprietary network interface cards 28, each providing a physical connection to different networks 16a, 16b, and 16d connected to different I/O devices 18. The integration appliance 26, as will be described in greater detail below, permits the programmer of the programmable controller 12 to work with a single logical network (common network 16c) thereby greatly simplifying the programming task and immunizing the control program created by the programmer against changes resulting from changes or additions to the networks 16a, 16b, and 16d communicating with the I/O devices 18. As noted above, the I/O devices 18 communicate input or output signals transmitted over the networks 16a, 16b, and 16d from and to a control process 20 according to techniques well known in the art.

Figure 4:
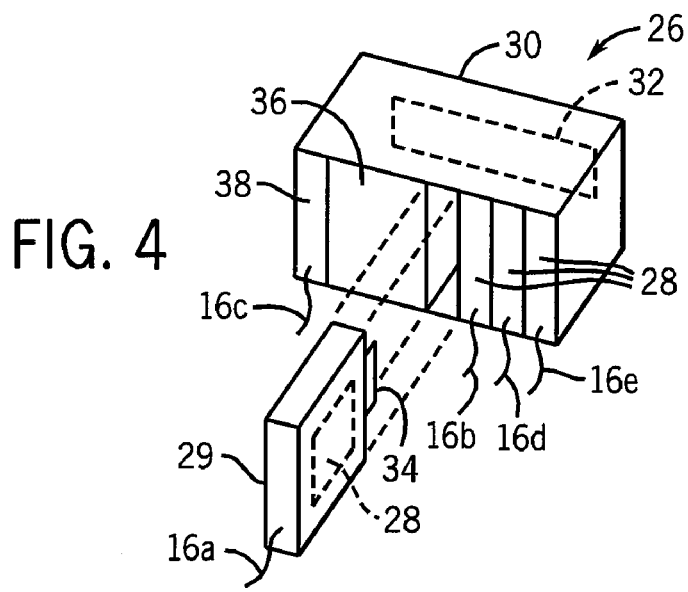
FIG. 4 is a perspective view of the adapter appliance of FIG. 2 showing modular construction allowing the introduction of different I/O network interface circuits to a common backplane.

Referring to FIG. 4, the integration appliance 26, in one embodiment, provides for a housing 30 having a rear wall supporting an electronic interconnection backplane 32. The housing 30 provides slots each accepting a different proprietary network interface card 28 associated with a different network 16a, 16b, and 16d. The proprietary network interface cards 28 are held within housings 29 that may be inserted removably into the housing 30 so that the internal proprietary network interface card 28 attaches to the backplane 32 by means of multi-pin connectors 34 on the rear of the housings 29.

The integration appliance 26 also holds a processor module 36 and a controller network interface card 38 communicating with common network 16c. The processor module 36 and controller network interface card 38 also connect to the backplane 32 allowing intercommunication of all connected components.

Figure 5:
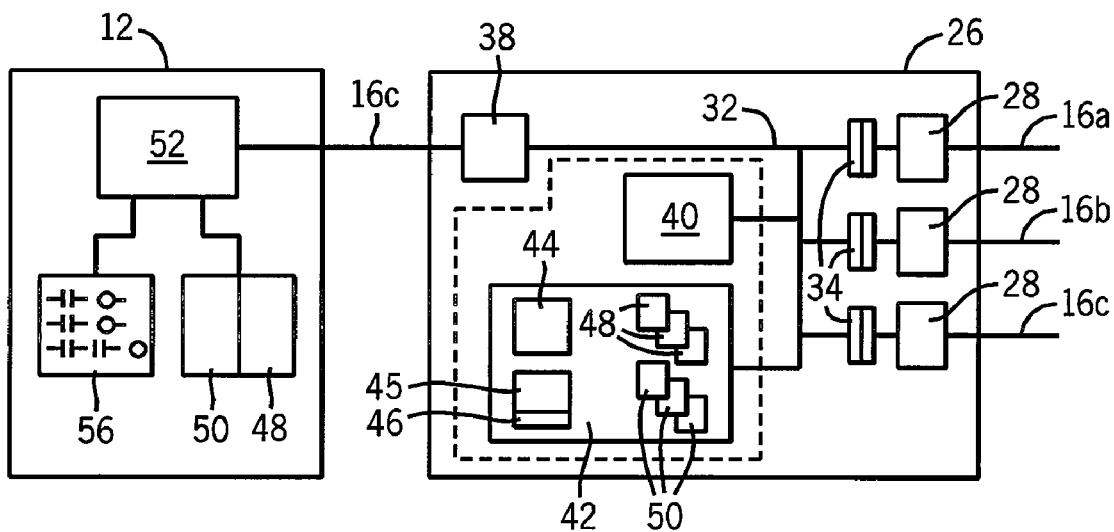
FIG. 5 is a block diagram of the adapter appliance of FIG. 4 showing data structures generated by the programmable controller and downloaded to the adapter appliance.

Referring now to FIG. 5, the processor module 36 includes a processor 40 preferably employing an internal extension of the backplane 32 to communicate with a memory 42 according to conventional computer architectures. The memory 42 may hold data and stored programs, the latter including an operating system 44 and an interpreter 45, including library functions 46. The library functions 46 provide common network functions, such as data copying, data table lookups, and scheduling, as well as data priority and quality of service implementations. The memory 42 also includes a set of downloaded scripts 48 being programs executed by the interpreter 45 as will be described. In addition, the memory 42 holds configuration files 50 providing configuration information for the networks 16a, 16b, and 16d. Generally, as will be described below, there will be one script for each different proprietary network interface card 28 and one configuration file 50 for each of the networks 16a, 16b, and 16d associated different proprietary network interface cards 28. The configuration files 50 may also provide configuration information for each I/O device 18. The configuration files 50 and scripts 48 may be generated by a control program development system 52, for example held in the programmable controller 12 when the programmable controller 12 is used as a development platform, or held in a freestanding computer 54. In this way, a single development environment may be used to create a control program 56 that will be executed on the programmable controller 12 to provide commands to and receive signals from the I/O devices 18 over common networks 16c and to create the configuration files 50 and scripts 48 which may then be downloaded to the integration appliance 26 upon initialization of the control system. This approach permits the programmable controller 12 to provide a single repository for all data necessary for the control system 10 while still permitting use of the integration appliance 26.

Referring now to FIGS. 4 and 5, as will be explained in more detail below, the integration appliance 26 uses the scripts 48 to translate between the model of the common network 16c and the individual networks 16a, 16b, 16d, etc. The scripts 48 thereby permit customizable intercommunication between the common networks 16c and the other proprietary networks 16a, 16b, and 16d. This intercommunication may be exploited in transmitting the necessary configuration files 50 from the integration appliance 26 to the I/O devices regardless of the intervening network 16a, 16b, and 16d.

Figure 6:
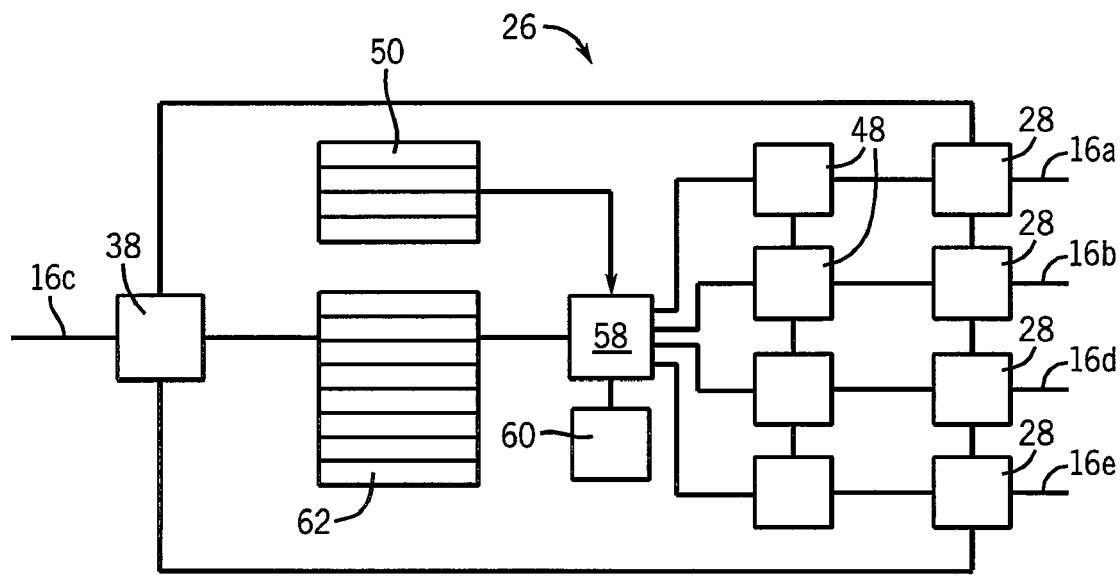
FIG. 6 is a logical diagram of the adapter appliance showing use of configuration files and interpreted scripts to provide for flexible accommodation of new I/O network types and features.

Referring still to FIG. 6, in this regard, the operating system 44 and interpreter 45 together implement a scanner 58 that coordinates a reception of messages on networks 16a, 16b, and 16d from the proprietary network interface card 28, ideally, according to a regular schedule to improve consistency of operation of the control system. In a first phase of this schedule and for each proprietary network interface card 28, the scanner 58 selects the appropriate script 48 (as executed by the interpreter 45 using the library functions 46) and, according to a mapper 60 using a mapping table generated from the configuration files 50, places the data received from the I/O devices 18 into an I/O buffer table 62 according to a logical address of that data per each of the networks 16a, 16b, and 16d. Concurrently, controller network interface card 38 receives data from the programmable controller 12 over network 16c for placement in the I/O buffer table 62 according to the logical address of the network 16c. In a preferred embodiment, the data from the common network 16c is not remapped but defines the common addresses of all exchanged data.

In a second phase of this schedule, the scanner 58 reads out values from the I/O buffer table 62 obtained from the programmable controller 12 in the first phase, and forwards this data on networks 16a, 16b, 16d using the appropriate script 48 and per the logical mapping of the mapper 60 to the appropriate I/O device 18. At the same time, the scanner 58 reads out values from the I/O buffer table 62 obtained from the I/O devices 18 in the first phase, and forwards them to programmable controller 12. In this latter case the scripts 48 are not required as the data has been previously reformatted into the proper form for common network 16c.

The I/O buffer table 62 may be filled by data pushed from the I/O devices 18 or pulled by scanner 58 in arbitrary order (e.g. asynchronously), but will normally be read out and thus exchanged between the programmable controller 12 and the I/O devices 18 in a particular order at given intervals so as to produce a control system that tends to provide consistent behavior without race conditions.

The use of scripts 48 allows great flexibility in the treatment of different networks 16a, 16b, and 16d both existing and that may be developed in the future. For functions provided by network 16c which are not supported by a given network 16a, 16b, or 16d, often the scripts 48 can provide a pseudo-function implementing the missing function through a combination of functions that are supported by the network 16a, 16b, or 16d. Alternatively, the scripts 48 may map functions supported by network 16c to lesser functions supported by the networks 16a, 16b, or 16d when that would be appropriate. When no mapping can occur, the scripts 48 may throw an exception to provide an error code to the programmable controller 12. The overall operation of the scripts 48 is to free the programmer from concern about the idiosyncrasies of particular networks 16a, 16b, and 16d.

While the integration appliance 26 is preferably self-contained to work with a variety of different programmable controllers 12, it will be understood that the integration appliance 26 may alternatively be incorporated into the programmable controller 12 itself.

Method of Synchronizing Configuration Changes

Figure 7:
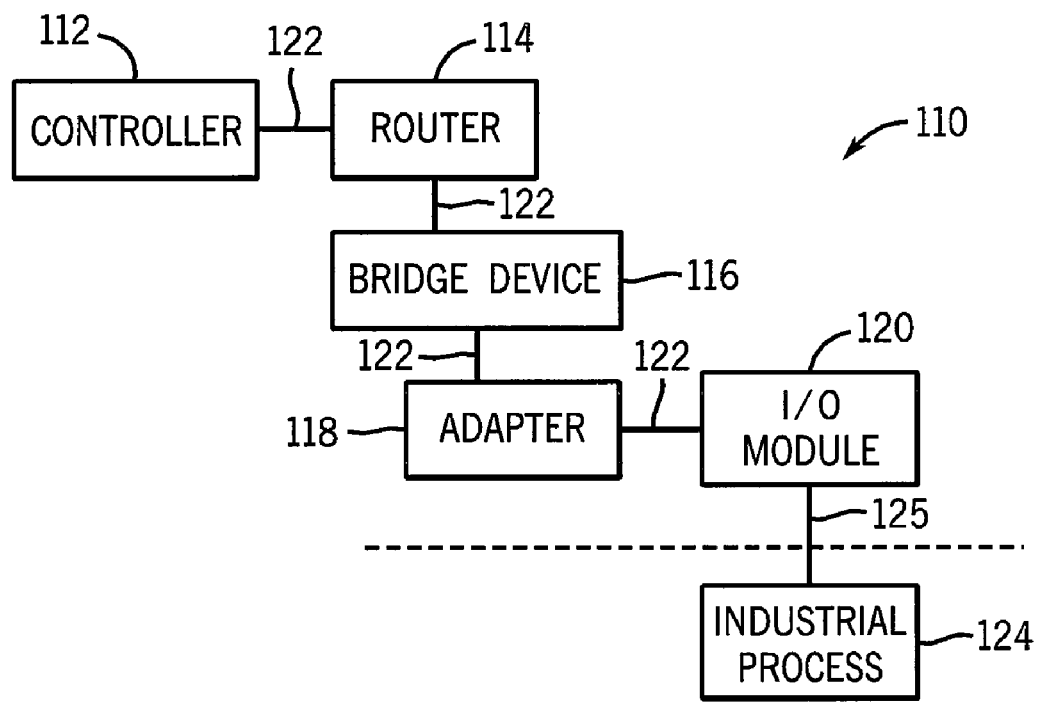
FIG. 7 is a simplified schematic view of an industrial control system including a distributed arrangement of controlled components.

Referring now to FIG. 7, an industrial control system 110 for which the present invention may be applicable generally includes a controller 112, a router 114, a linking or bridging device 116 such as a scanner, an adapter module 118, and an I/O device or module 120. For purposes of illustration, a simplified control system is shown, but it is understood that in a real-world application, the control system may include numerous I/O devices, routers, linking devices, and adapters to control an industrial process, or a portion thereof. Data is communicated between the controller 112 and the I/O module 120 through the router 114, linking device 116, and adapter 118 across multiple data communications network segments 122. Each network segment 122 may be any one of a number of network technologies used between two components, such as ControlNet, EtherNet/IP and the like. As is understood in the art, the I/O device 120 converts the digital data received over the communications network 122 from the adapter 118 into output signals 125 (either digital or analog) in a form suitable for connection to its portion of the industrial process 124. The I/O module 120 may also receive digital or analog signals 125 from the industrial process 124 and convert the signals to digital data suitable for transmission on the communications network 122 across the network segment 122 to the adapter module 118 and ultimately across the various other network segments 122 to the industrial controller 112.

The industrial controller 112 executes a stored program to control the industrial process 124. The stored program is typically created using a dedicated software package or suite, such as the RSLogix suite of products commercially available from Rockwell Automation, Milwaukee, Wis. As schematically shown in FIG. 8, a workstation 126 may interface with the industrial controller 112 to enable a programmer to load or modify the control program or the configuration of any of the control system components.

In one embodiment, the industrial controller 112 is programmed using an object-oriented programming language; however, it is understood that other programming languages may be used. The workstation 126 may interface with the industrial controller 112 to modify, add, or delete various objects stored in a memory 128 of the industrial controller 112 and used to implement its functionality. In particular, the objects may include I/O objects needed to manage the configuration of the hardware of the I/O modules 120. Exemplary objects include symbols, data tables, templates, I/O maps, and I/O connections. Collectively, the objects maintained in the memory 128 that implement the functionality of the industrial controller 112 may be referred to as the control program of the industrial controller. Hence, the workstation 126 provides a programming interface for updating the control program of the industrial controller 112. An exemplary framework for communicating between the workstation 126 and the industrial controller 112 for programming the industrial controller 112 is described in U.S. Pat. No. 6,819,960, entitled "Industrial Controller Automation Interface," subject to assignment to the assignee of the present application, and incorporated herein by reference in its entirety.

Figure 8:
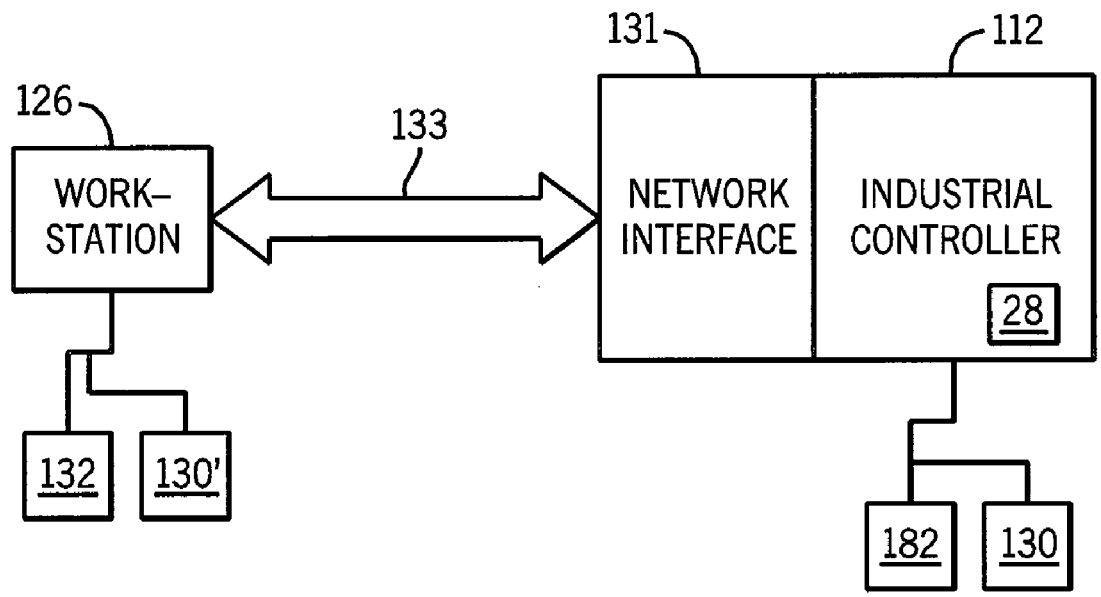
FIG. 8 is a schematic representation of a programming interface and industrial controller communicatively linked to programming and configuring the industrial controller and the distributed arrangement of controlled components shown in FIG. 7.

As shown in FIG. 8, within its memory 128, the industrial controller 112 maintains an object database 130. In general, the object database 130 lists the states of the various control program objects used by the industrial controller 112. The format employed by the industrial controller 112 for indexing objects may vary.

The workstation 126 provides a programming interface 132 (i.e., software application) through which a user may interface with and program the industrial controller 112 and other components of the control system. As known in the art, a network interface 131 enables the industrial controller 112 to communicate with the programming interface 132. The programming interface 132 programs the industrial controller 112 using transactions that are presented to the industrial controller through the network interface 131 across a communications network 133 as known in the art. Each transaction includes a plurality of operations, which are operated on by the industrial controller 112, but kept in a pending state until the transaction is committed. The programming interface 132 maintains a synchronized copy of the object database 130'.

The workstation 126 implements a transaction technique where operations performed by the workstation 126 for changing objects in the industrial controller 112 are grouped into a single transaction that is not fully acted upon until a Commit signal issued by the workstation 126 is received by the industrial controller 112. Operations interrupted or aborted prior to receiving the Apply signal may be rolled back, leaving the industrial controller 112 in its original state. The workstation 126 may communicate with the industrial controller 112 to modify aspects of the controller's operation, such as the control program. The workstation 126 may also communicate with the industrial controller 112 to configure and enable additional I/O functionality. From the standpoint of the user, a transaction is an atomic event, in that it entirely succeeds or is aborted.

Figure 9:
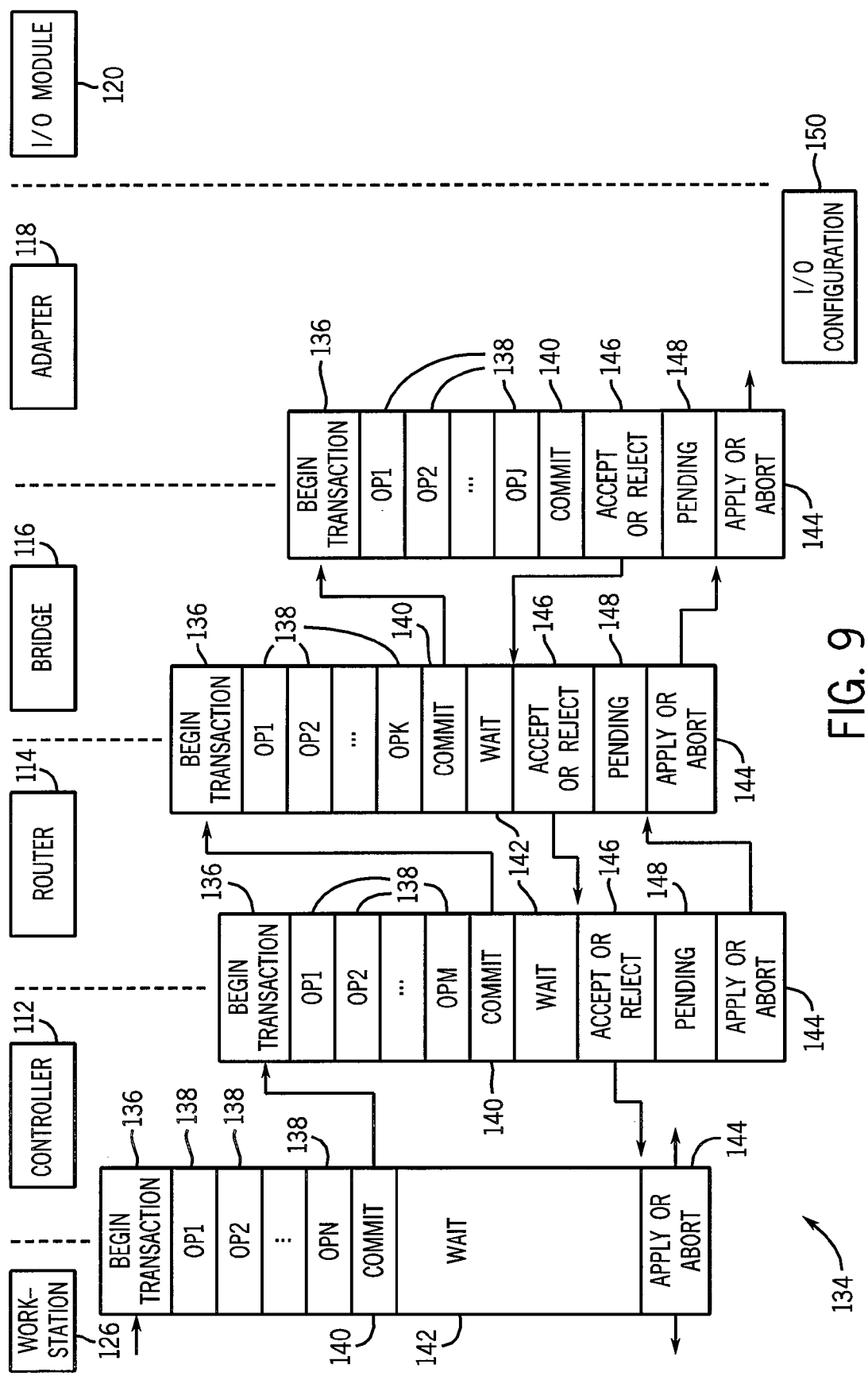
FIG. 9 is a diagram illustrating a transaction for providing configuration data to the industrial controller and the controlled components.
Figure 10:
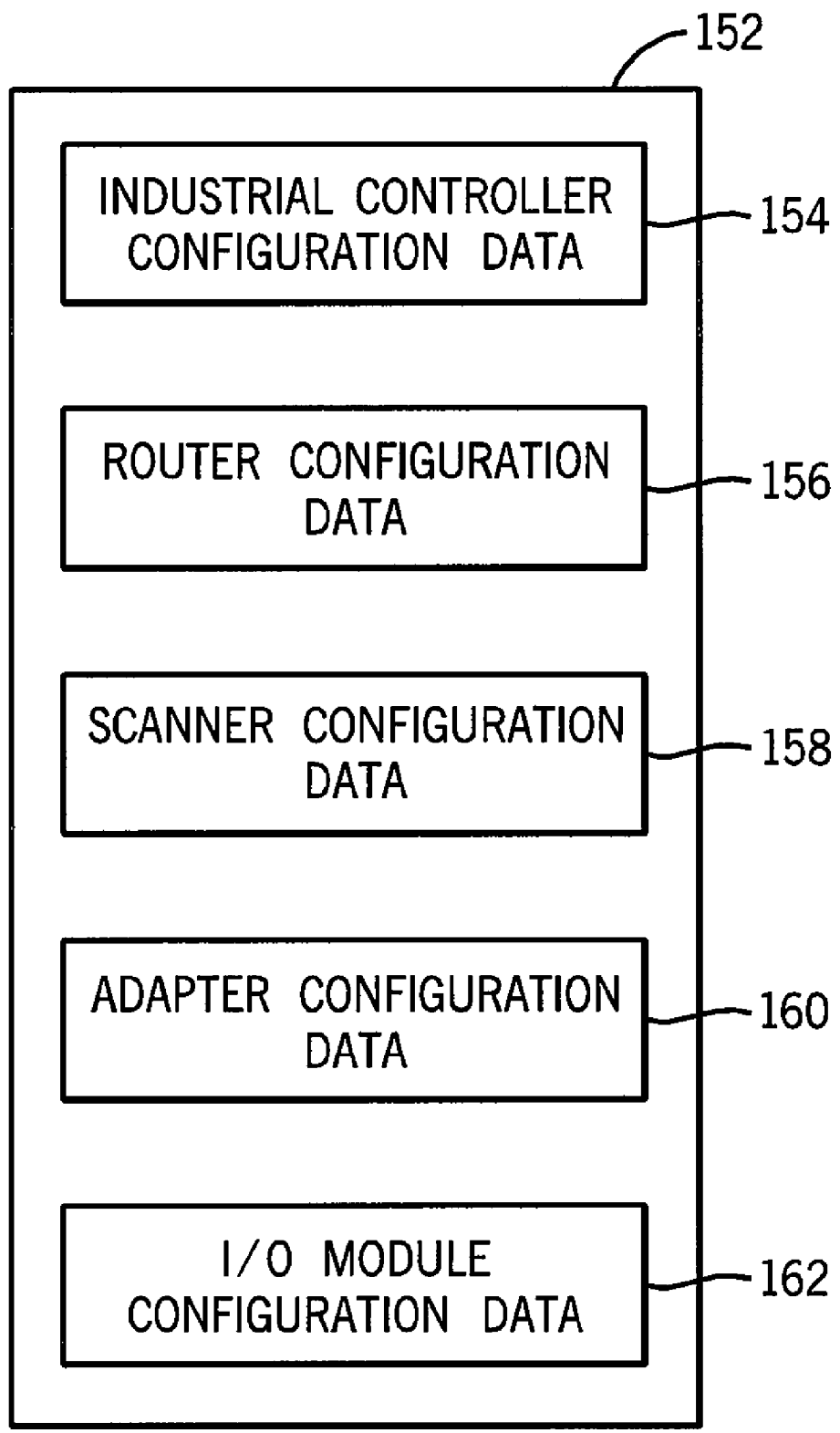
FIG. 10 is a schematic representation of a configuration file including configuration data for each of the controlled components shown in FIG. 7.
Figure 11:
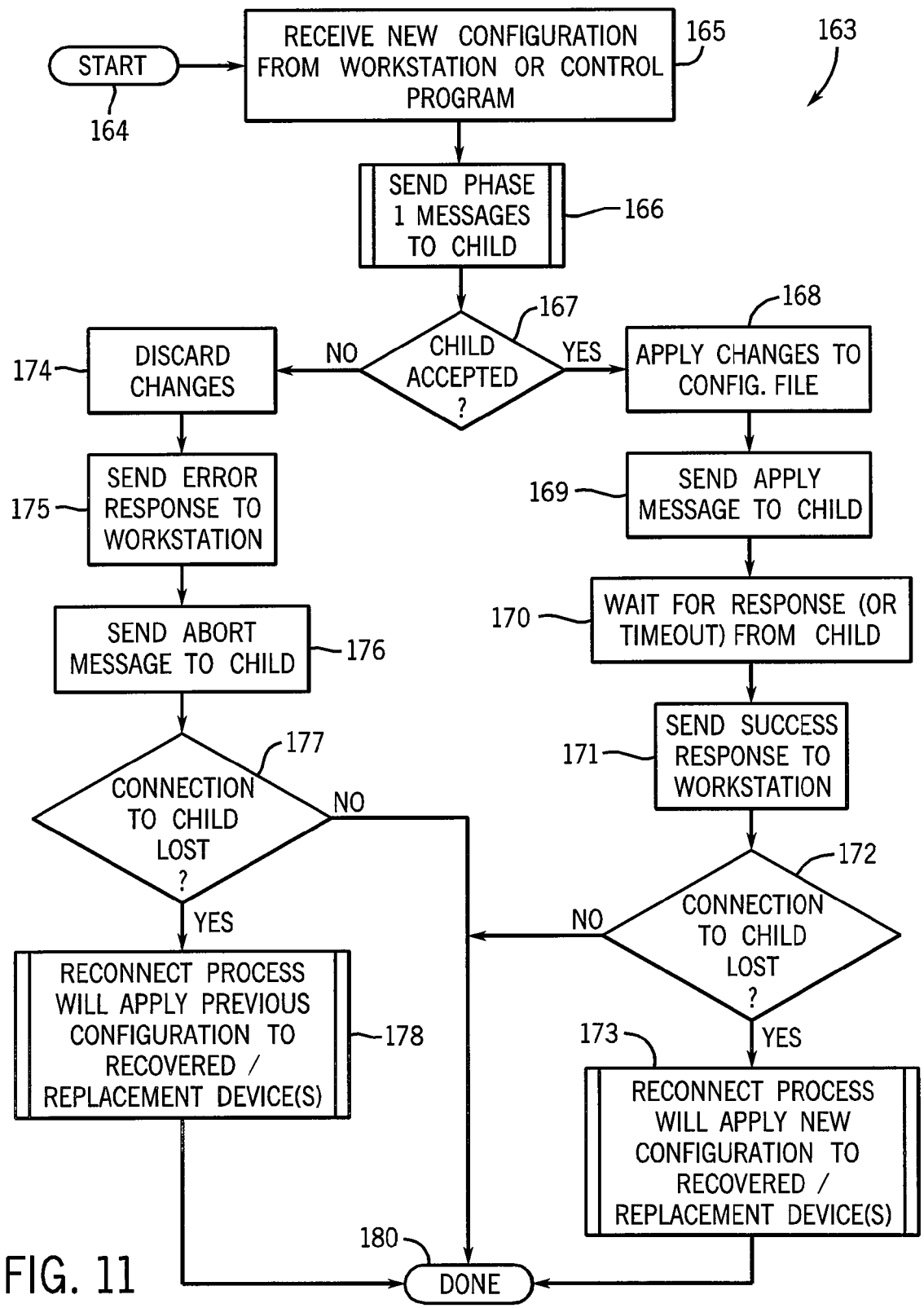
FIG. 11 is a flow chart setting forth the steps carried out by a controller or root device for communicating and implementing configuration changes in the controlled components shown in FIG. 7.
Figure 12:
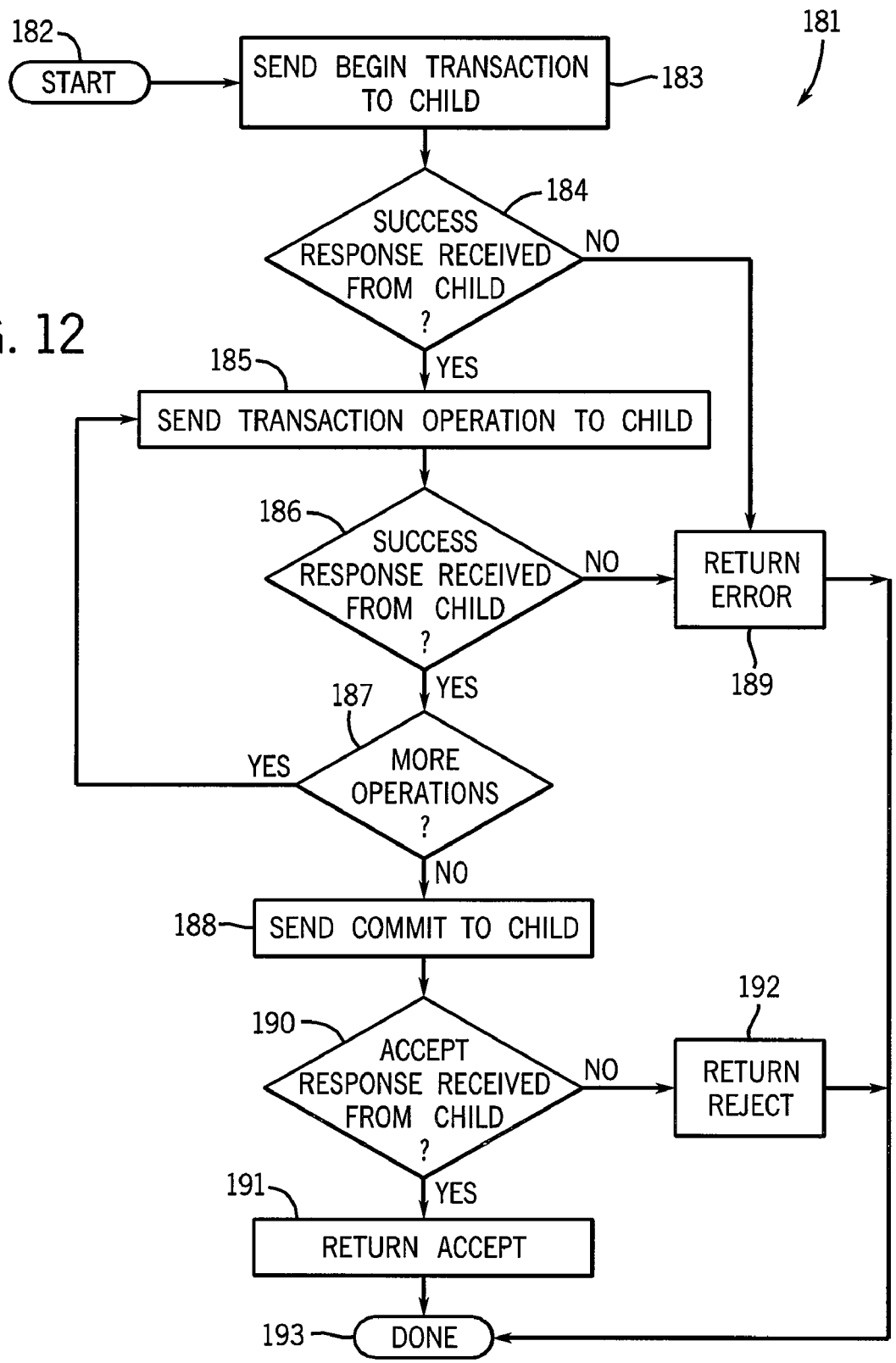
FIG. 12 is a flow chart setting forth the steps carried out by a parent device to transmit messages to a child device.

Turning to FIG. 9, a diagram illustrating the components of an exemplary two-phase transaction 134 for providing configuration data through the chain of controlled components is provided. The first phase of the transaction 134 includes a begin transaction command 136 followed by one or more operation commands 138. The operation commands 138 are followed by a Commit transaction 140. The commit transaction 140 triggers the end of the first phase of the transaction 134. The second phase, issuance of the Apply or Abort transaction command 144, of the transaction 134 is not initiated until feedback in the form of an Accept or Reject response 146 is received (or communication is deemed timed out) from each of the controlled components. In this regard, a wait cycle 142 is initiated as the controller 112 waits for feedback from the controlled components. Each component provides an Accept or Reject response 146 to its parent. Once the Accept or Reject response 146 has been received at the controller 112, an Apply or Abort transaction command 144 is provided to the controlled components, which signals the end of the second phase of the transaction 134. As further shown in FIG. 9, each component goes to a pending state 148 after transmitting the Accept/Reject response 146 whereupon the component waits for either an Apply command or an Abort command.

If each of the controlled components provides an Accept response, then an Apply transaction command is communicated from the controller 112 to the controlled components and the workstation. However, if a Reject message is received from any of the controlled components, the industrial controller 112 issues an Abort transaction command to each of the controlled components and the workstation. In this regard, changes in the configuration of the controlled components are made globally, i.e., each of the controlled components must affirmatively indicate a readiness to accept the proposed configuration changes, before such changes are made. Thus, changes to the I/O specific configuration processes 150 are not made unless each of the upstream controlled components also accepts the changes contained in the configuration file.

The programming interface 132 sends the transaction 134 one operation command 138 at a time, and the industrial controller 112 preprocesses each operation 138 in turn, but keeps the objects of the operation commands 138 in a pending state, e.g., in a buffer. Preprocessing may involve checking the syntax of the operation, reserving memory, checking the state of an existing object, instantiating a pending object, etc. For example, a new object may have a state of "Pending Create," a modified object may have a state of "Pending Modify," and an object to be deleted may have a state of "Pending Delete."

Memory is reserved for the objects as their associated operation commands 138 are received and preprocessed. In the case where an object is to be modified or deleted, the industrial controller 112 ensures that the requested operation can be performed (i.e., the referenced object exists and is in a state where modification or removal is allowed), but the actual completion of the action is deferred. The values for a pending modify object remain unmodified and the actual change values are cached so that they can be applied (or discarded) during the Apply or Abort command 144. Operation commands 138 that modify pending new objects need not be deferred as they do not affect a current object.

As described above, changes to the object database 130 are not committed until an Accept/Reject response 146 is received from the first network element (which represents an Accept/Reject response from all subordinate devices). Thus, a two-phase or two-step transaction protocol is used in which changes are sent in a series of first transactions 36-40, and the second set of operations 140, 146, and 144 result in the changes proposed in the first phase being wholly accepted or rejected by all of the components.

As described above, the industrial controller 112 is one of the components of the industrial control system 110. Referring to now to FIG. 110, a representative configuration file 152 is shown. The configuration file 152 may, in fact, take the form of multiple files generated using the programming interface 132, but for purposes of illustration, a single configuration file is shown in FIG. 110. The configuration file 152 includes configuration data for each of the controlled components. In this regard, the configuration file 152 includes an industrial controller configuration data block 154, a router configuration data block 156, a scanner configuration data block 158, an adapter configuration data block 160, and an I/O module configuration data block 162.

For the industrial process 124 to be effectively controlled, the configuration of the controlled components should be in sync with the control program. That is, each component should operate according to the most recent configuration data provided for that component. Moreover, given the interrelationship of the components, a given component should operate according to the configuration data that other components of the system believe define operation of the given component. Thus, the present invention provides a transaction process designed to ensure that configuration changes are accepted by all of the components before such changes are applied.

Referring now to FIG. 111, a process 163 carried out by the controller 112 (or other "root" originator device for distributing the configuration file 152 to the affected components (114, 116, 118, or 120) of the industrial control system 110) begins at block 164 with reception of the new configuration file at block 165 from the programming interface 132 or programmatic modifications made to the configuration file by the control program. As shown in FIG. 110, the configuration file may include new configuration data blocks for some or all of the controlled components of the industrial control system. The configuration file is then communicated to the controlled components at block 166 in a series of transaction commands as described above and in FIG. 112. More particularly, the configuration file is cascaded to each of the controlled components with each of the controlled components storing their respective portions of the configuration file in local temporary memory, such as a buffer. Each controlled component evaluates the portion(s) of the configuration file that pertain to it as described in FIG. 113, returning the results of its analysis to its parent, which are ultimately reflected in the response that the controller receives at block 167 to determine if the changes in the configuration file can be accepted as a whole across the effected control components.

If all of the control components have indicated that they can accept the proposed changes, then the controller applies the changes to its internal copy of the configuration file at block 168, and sends the Apply message to the effected children in block 169 to complete the second phase of the overall transaction. After the response from the child is received (or the timeout expires) at block 170, the controller returns a Success response to the programming interface at block 171. It is understood that even if communications to one or more control components are lost during the Apply phase (represented by block 172), the new configuration will still ultimately be applied to the device, as a reconnect process block will attempt to apply the most recent configuration before the I/O connection to the device is restored at block 173.

Returning for a moment to the Acceptance indication at block 167, if any one of the control components has indicated that it cannot accept the new configuration for any reason, the controller discards the pending configuration file updates 174, sends an Error response to the programming interface at block 175, and sends an Abort message to the appropriate child(ren) in block 176. Even if the connection to one or more control components is lost during the Apply phase (represented by block 177), the previous configuration will be maintained in the device through the reconnect process 178. Once the configuration files have been updated, the process 163 ends at block 180.

In FIG. 112, the process 181 that a parent uses to send the applicable portion of the new configuration file to its child is presented.

The process 181, once initiated at block 182, continues with transmission of transaction to a child at block 183. If a success response has been received from the child at block 184, the parent device transmits the transaction operation to the child at block 184. If the transaction was successfully transmitted, block 186, and there are no more transactions to transmit to the child, block 187, a Commit transaction is presented to the child at block 188. However, if there are additional operations, the process loops back to block 185. Also, if the transmission was not successful, an error signal is returned at block 189. If the Commit transaction was successfully received by the child as indicated by reception of an Accept response at block 190, a return Accept command 191 is transmitted from the parent to the child. If an Accept response was not received, a Reject transmission is returned to the child device at block 192. The process is complete at block 193 after either an Accept, Error, or Reject communication is communicated from the parent to the child. In this regard, after each request, the parent waits for the results of the child's evaluation, which will be indicated in the response. If an error (or connection related error, such as timeout) is indicated, the first phase will be terminated early at block 193. In the error case, any descendants of the child being acted on will never become aware that the configuration update was attempted. If all of the operations are successful, the Phase 1 processing returns an Accept indication at block 191.

Figure 13A:
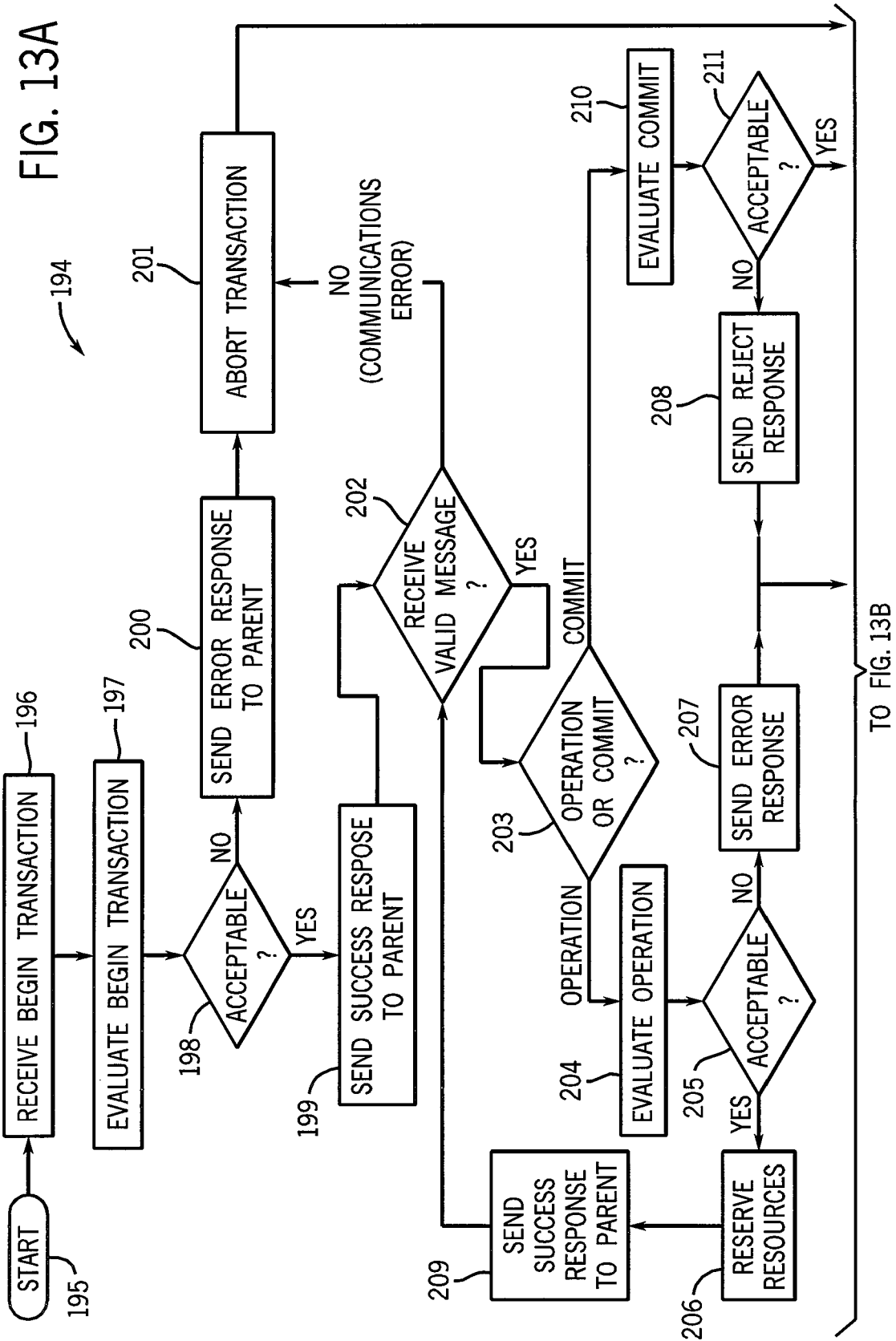
FIG. 13 is a flow chart setting for the steps carried out by a child device to implement changes provided thereto by a parent device.
Figure 13B:
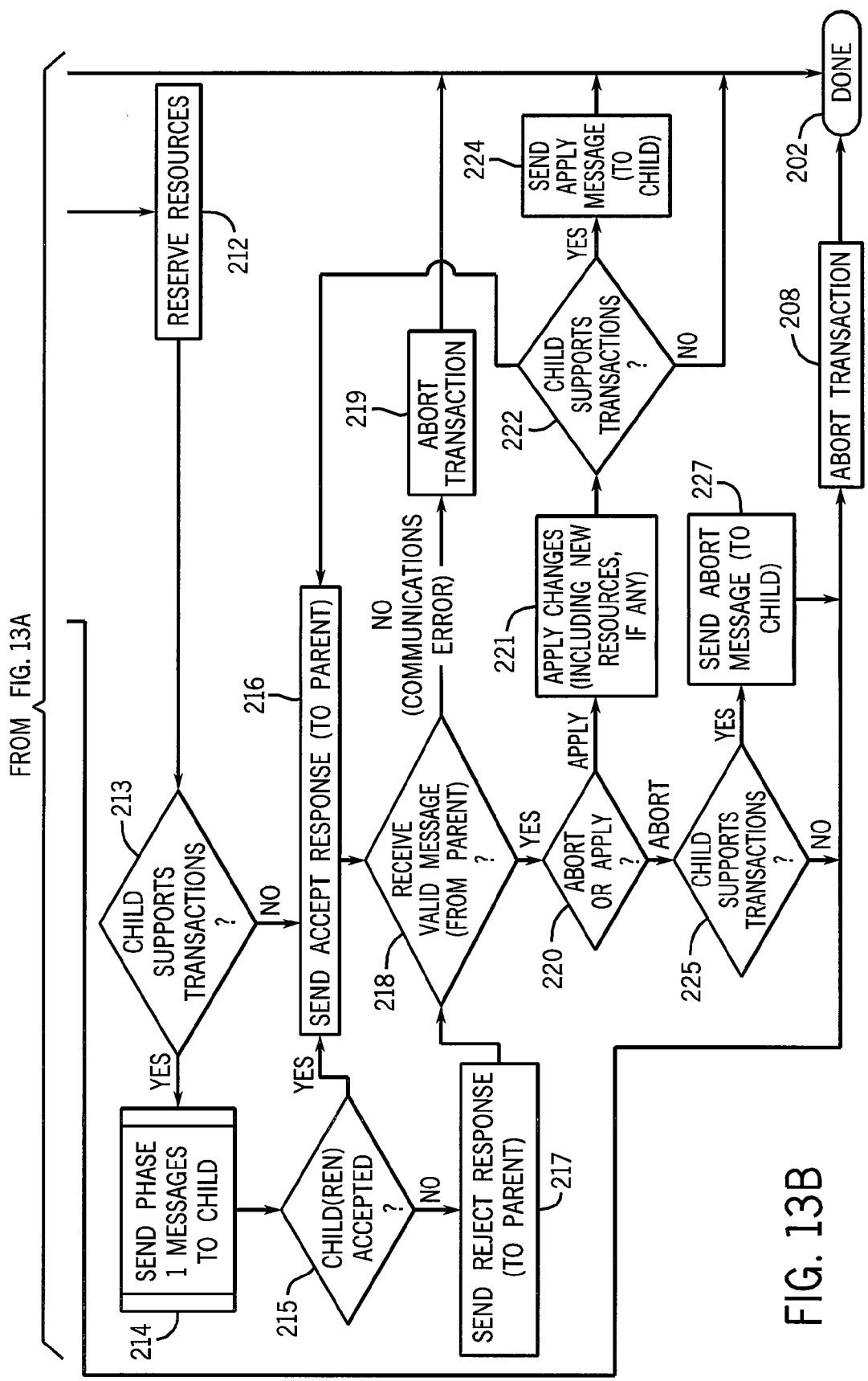

FIG. 13 presents the process that each child performs as it evaluates the new configuration file being transmitted within the multi-phase transaction. The process 194 once initiated at block 195 begins with reception of a Begin Transaction request from the parent in block 196. In block 197, the child determines whether or not present state permits it to accept a transaction request. If acceptable at block 198, a Success response is returned to the parent at block 199, and the child waits for a sequence of transaction operations. Otherwise, an Error response is transmitted at block 200 to the parent and the updating process is aborted at block 201 and the process ends at 202.

Once the child has determined that the present state allows it to accept the transaction request and a corresponding success communication is transmitted to the parent, the child determines if a valid message has been received from the parent at block 202. If not, the transaction is aborted at block 201. Otherwise, the process 194 continues to block 203 and determines if the message is an operation or a Commit transaction. If the communication is a transaction operation, the operation is evaluated at block 204. If acceptable at block 205, any resources that the child will need to apply the changes necessary are reserved in block 206, or else an Error response is returned to the parent in block 207 ultimately resulting in aborting of the transaction at block 208 and termination of the process at block 202. If the operation is acceptable and the resources have been allocated, a success response is transmitted to the parent at block 209.

If the message is a Commit transaction, the child must then determine if it can accept the proposed changes in their entirety at block 210. If the changes are acceptable at block 211, the child allocates the necessary resources at block 212 and then determines if its child supports the transaction at block 213. If so, the child extends the cascade by forwarding the applicable changes to its child at block 214 if it supports the multi-phase transaction as determined at block 213. If the child(ren) accept the cascaded message at block 215 an Accept response message is sent to the parent at block 216. Similarly, if the child does not support the transactions as determined at block 213, an Accept response is transmitted to the parent device at block 216. If any of the descendants cannot support the changes, the Reject will be returned in block 217.

The process continues to block 218 to determine if a valid message has been received from the parent. If not, the transaction is aborted at block 219 and the process ends at block 202. Otherwise, the child determines if the received message is either an Apply message or an Abort message at block 220. If the received message is an Apply message, the changes to the configuration files for the child are applied at block 221. The child then determines if its child(ren) support the transaction at block 222. If so, an Apply message is sent to the child(ren) at block 224 signaling the child(ren) to update its configuration files. If the child(ren) does not support the transaction, the process returns to block 216. It should be noted that in some cases, it may be necessary to determine the I/O component (i.e. the final element that does not support multi-phase transactions) before indicating the acceptability of the proposed changes. To support this case, the process will attempt to perform an I/O Specific Configuration Process. This is just an extension of the cascade concept to include the first control component that does not directly support the multi-phase transaction. The programming interface or control program logic will specify whether the final element's evaluation of the proposed configuration changes should be included If the message from the parent is an Abort command, the process determines if the child supports such a transaction at block 225. If so, an Abort message is transmitted to the child device at block 227. Ultimately, whether the child supports the transaction or not, the transaction is aborted at block 208 and the process ends at block 202. In this regard, if a transaction includes multiple chains from the controller to I/O components that do not share the same immediate parent, the Abort message only needs to be cascaded down the chains that indicated their ability to Accept the proposed changes.

It should be noted that if the commit command received at block 210 is unacceptable, the transaction is also aborted at block 208 whereupon the process ends at block 202.

The present invention has been described in terms of the preferred embodiment, and it is recognized that equivalents, alternatives, and modifications, aside from those expressly stated, are possible and within the scope of the appending claims.

We claim:

1. An industrial control system comprising:
   an industrial controller that executes a stored program to control an industrial process, the industrial controller including:
   a plurality of components comprising:
   a controller;
   at least one I/O device communicating with the controller and adapted to exchange I/O data between the industrial controller and the industrial process according to configuration data;
   at least one network device communicating between the controller and the I/O device according to configuration data; and
   a programming interface executing on the industrial controller and operative to:
   provide modifications to at least one of the stored program and configuration data; and
   provide the modifications of at least one of the stored program and configuration data to the components in a multiphase operation that includes a first phase that provides the modifications to the components, and a second phase that applies the modifications to the components for use in controlling the industrial process if and only if all the components indicate that they will be able to support those modifications.

2. The industrial control system of claim 1 wherein the programming interface provides the modifications to at least one of the stored program and configuration data to the industrial controller and the industrial controller passes the modifications to each component.

3. The industrial control system of claim 1 wherein at least one network device includes a router, a scanner, and an adapter, and wherein the industrial controller, the router, the scanner, the adapter, and the I/O device are operatively linked to one another in a cascade arrangement.

4. The industrial control system of claim 3 wherein modifications to each component's configuration data are first provided to the industrial controller and the modifications are then cascaded to the router, the scanner and the adapter.

5. The industrial control system of claim 4 wherein the router, the scanner, and the adapter each include a temporary memory location in which the modifications are temporarily stored before they are applied.

6. The industrial control system of claim 1 wherein a command providing application of the modifications is propagated sequentially to the components.

7. The industrial control system of claim 1 wherein the components analyze the modifications before they are applied to provide a signal indicating whether each of the components can support the modification.

8. The industrial control system of claim 7 wherein the I/O device includes a motor drive.

9. The industrial control system of claim 7 wherein the components each store the modifications in a temporary memory location and provide an acknowledgement signal if they can support the modification, and wherein a command is provided to the components to apply the modifications only in response to an acknowledgment single from all components receiving the modifications.

10. An industrial control system for controlling operation of an industrial process, the control system comprising:
    a plurality of control devices that execute a control program for interfacing with the industrial process, the plurality of control devices arranged in a cascade arrangement; and
    a programming interface communicatively linked to the plurality of control devices and operative to provide a modified control program to each of the control devices in a first phase and a second phase, wherein the first phase comprises a transmit command instructing each control device to evaluate and store the modified control program in a temporary memory location and the second phase comprises an apply command instructing each control device to remove the modified control program from the temporary memory location and replace the locally stored version of the control program with the modified control program wherein the apply command is not issued until each of the plurality of control devices affirmatively indicates a readiness to implement the modified program.

11. The industrial control system of claim 10 wherein the programming interface provides the modified program to a first control device of the plurality of control devices and the modified program is cascaded to the remaining control devices of the plurality of the control devices in a series of messages.

12. The industrial control system of claim 11 wherein each of the plurality of control devices includes a buffer that temporarily stores the modified program.

13. The industrial control system of claim 12 wherein each of the plurality of control devices provides a confirmation signal to an upstream control device of the cascade arrangement in receipt of the modified configuration and receipt of such confirmation from its child, if applicable.

14. The industrial control system of claim 10 wherein the modified configuration is not stored by each of the control devices unless all of the control devices signal Acceptance of their respective portions of the modified configuration.

15. The industrial control system of claim 10 wherein the plurality of control devices are arranged in a cascade arrangement and the transmit command is cascaded from a first control device to a last control device.

16. The industrial control system of claim 15 wherein the cascade arrangement includes at least one of the industrial controller, a router, a scanner, an adapter, and an I/O module.

17. A method of transferring changes to a configuration from a controller to a plurality of controlled devices in an industrial control system, each configuration locally stored by the controlled devices, the method comprising:
    cascading a first command sequence to each of the controlled devices, the first command sequence containing proposed changes to the configuration;
    storing the proposed changes to the configuration in a temporary memory location on the controlled device;
    waiting for each of the controlled devices to accept the proposed changes;
    cascading a second command to the controlled devices upon confirmation that each of the controlled devices has accepted the first command sequence; and
    updating the local version of the configuration from the temporary memory to include the changes contained in the first command.

18. The method of claim 17 wherein the controlled devices are arranged relative to one another in a cascade arrangement, and further determining if each upstream controlled device has received an acknowledgement signal from an immediate downstream controlled device and if so providing the second command to the cascade arrangement such that each upstream controlled device provides the second command to an immediate downstream controlled device.

* * * * *